Patented Jan. 9, 1951

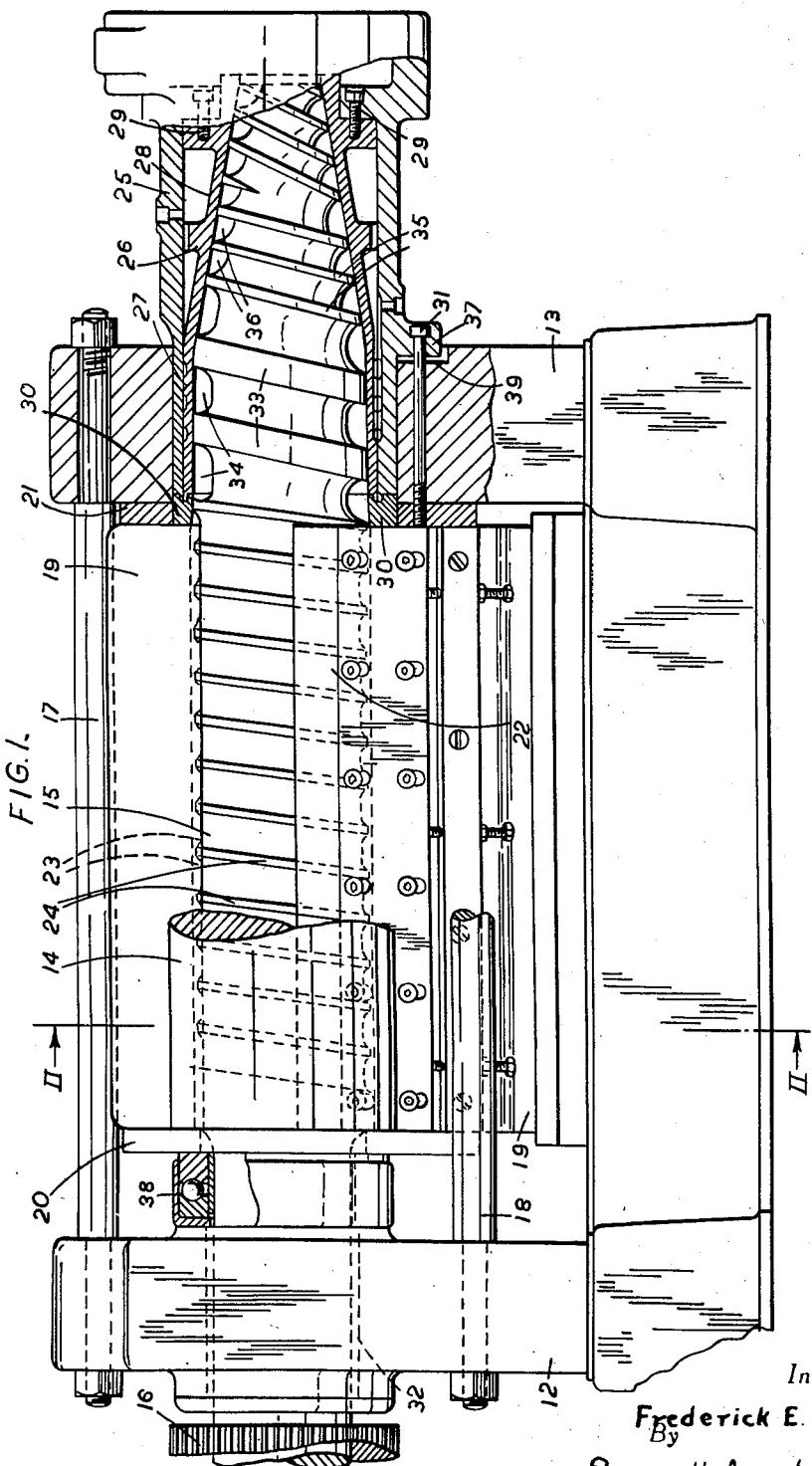

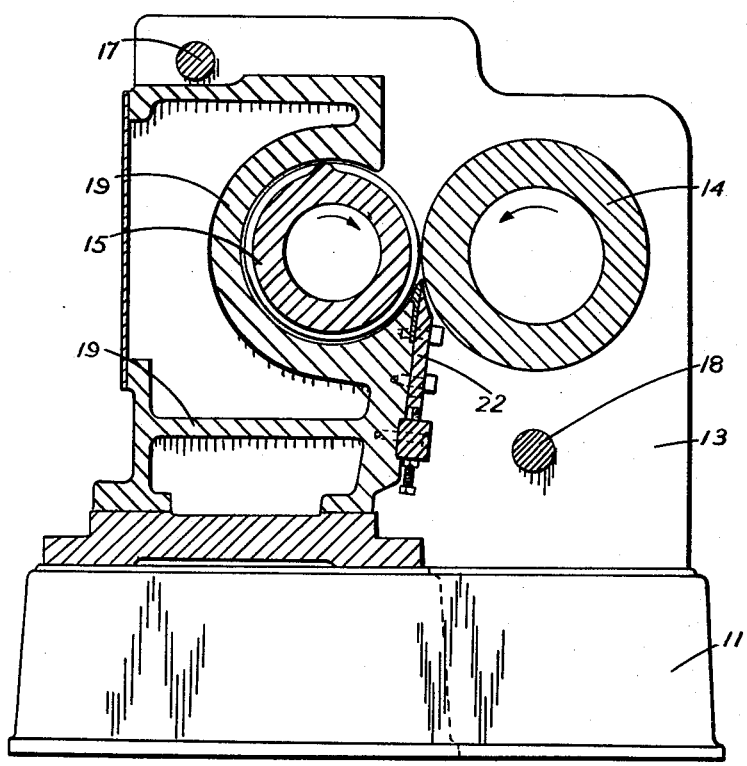

2,537,395

UNITED STATES PATENT OFFICE 2,537,395

MACHINE FOR WORKING RUBBER OR OTHER PLASTIC MATERIALS

Frederick Edward Brown, Hyde, England

Application September 6, 1947, Serial No. 772,566
In Great Britain September 19, 1946

16 Claims. (Cl. 18—12)

This invention relates to machines for working or mixing rubber or other material of a plastic or viscous nature.

In Patent No. 2,264,237 issued to me on November 25, 1941, I have disclosed a machine in which rubber is worked by being passed through the nip formed by a main working roller and a front or feed roller and by being repeatedly forced through a space between the working roller and a casing partly surrounding that roller. To cause the rubber to travel axially through the machine so that the rubber is continuously forced to an extrusion head or the equivalent at one end, the working roller may be helically grooved. Now the pressure between the front and working rollers as the rubber passes through the nip between them is considerable. The length of the working roller or scroll throughout which the working takes place is enough to make it essential to support the roller at or close to each end. The roller can conveniently be supported at the end remote from the extrusion head by a main journal bearing, but it is not feasible to provide a bearing in or beyond the extrusion head itself. Accordingly I have hitherto relied on contact between the tops of the scroll threads and the casing of the extrusion head to provide the desired support at the delivery end of the scroll. This is not satisfactory as the threads become worn and in consequence the efficiency of the scroll is reduced.

In addition, with such a construction it is not easy to vary the width of the working space, that is to say, the distance between the casing and the working roller.

It is an object of this invention to provide improved bearing means for the working roller of a machine of the kind in question.

It is another object of the invention to increase the efficiency of the machine, when used for extrusion, by relieving the extrusion threads of bearing pressure.

In my present invention the working roller is supported not only in a journal bearing at the end remote from the outlet but also between the grooved working length and the outlet it has a cylindrical part formed with threads wholly surrounded by and engaging a cylindrical bearing. It is not enough simply to provide a groove through which the rubber or the like can travel in passing through this second bearing. It is found in practice that a helically grooved roller suitably designed for mixing and working rubber or the like is inefficient as a means for delivering material axially and in order to ensure that all the material delivered to the bearing length by the working length of the working roller is moved axially at the desired speed, particularly when the back pressure of an extrusion head has to be overcome, it is necessary to make the volumetric capacity of the bearing length greater than that of the working length. The volumetric capacity per minute may be defined as the cross-sectional area of the groove multiplied by the mean diameter of the groove multiplied by the number of starts of the thread multiplied by the revolutions per minute. Accordingly the requirement is that in the bearing length the available cross-sectional area for the passage of material between the threads must be larger than that presented by the groove or grooves in the working length.

It will be understood that the invention is of particular value when the end of the working roller enters an extrusion head, but if the machine is to be used for working a material without positively extruding it through a die, but rather simply discharging the material axially, the working roller may terminate at the outer end of the cylindrical bearing, which end then constitutes the outlet from the machine.

One machine according to the invention will now be described by way of example with reference to the accompanying drawings, in which:

Figure 1 is an elevation with part cut away and partly in section; and

Figure 2 is a section on the line II—II in Figure 1.

The machine shown comprises a bed plate 11 and two upstanding brackets 12 and 13 in which a front or feed roller 14 and a rear or working roller 15 is carried, these rollers being driven through gearing 16. The brackets are interconnected by top and bottom rods 17 and 18. The working roller 15 is partly surrounded by a casing 19 formed by a casting secured to the bed plate 11 and two end plates 20 and 21. The end plate 20 is secured to the casting by bolts not shown. The casing runs from below the nip formed by the two rollers to a point beyond the upper centre of the roller 15 but short of the nip so as to leave a space in which material can bank up over the feed nip. Rubber to be worked is fed to the nip between the two rollers at the left-hand end of the machine as seen in Figure 1. It passes through the nip and is forced into the space between the roller 15 and the casing 19 by an adjustable scraper blade 22 which is carried by the lower forward part of the casing 19 and extends throughout the length of the casing 19 and bears against the feed roller 14 just below the feed nip. In order to force the rubber to travel axially while it is being worked, the working roller 15 is helically grooved as shown at 23, the grooves being wide and shallow and separated by ribs having narrow tops 24. The rubber travels axially and comparatively slowly and in the course of its travel is forced out of the working space between the roller 15 and casing 19 and delivered again to the nip between the rollers 15 and 14 and forced back again into the working space.

At the right-hand end of the machine as seen in Figure 1 there is an extrusion head through which the rubber is extruded axially. This head includes an outer casing 25 and an inner sleeve 26 which is partly cylindrical as shown at 27 and partly conical as shown at 28, the two parts being secured together by bolts 29 at one end and by a ring 30 which fits tightly in the end plate 21 at the other end. The complete head is secured to the casing 19, by bolts 31 which pass through the bracket 13 and the end plate 21. The end of the working roller 15 is tapered in complementary fashion to the conical part 28 of the sleeve 26.

During the operation the forces produced as a result of the compression of the rubber in the working space are substantial. At the feed end the working roller passes through a thrust bearing 38, which takes the thrust set up by the extrusion of the rubber, and is carried in a plain journal bearing 32 carried by the bracket 12. The presence of the extrusion head makes it difficult to give the roller similar journal support at the discharge end, and to overcome this difficulty the cylindrical part 27 of the sleeve 26 is provided to form a bearing through which the roller 15 passes. The length of the roller which lies within the bearing part 27 is grooved with ribs 33 and grooves 34 in continuation of the grooves 23 but in this bearing length the ribs and grooves are both widened, so that the tops or landings of the ribs 33 present large bearing surfaces to the bearing part 27. The grooves 34 are made not only wider but also deeper than the grooves 23. The tapered end of the roller 15 is formed with ribs 35 and grooves 36, the ribs 35 being narrower than the ribs 33 throughout the bearing length. What is required is substantial volumetric capacity in the bearing length to force the rubber axially and similar but substantially constant volumetric capacity in the extrusion or tapered length of the roller 15. These requirements are satisfied by the construction of working roller shown. The ribs 35 at the input end are constituted by a two-start thread which merges into a three-start thread at the output end of the tapered part. For ease of manufacture, the pitch of the bearing ribs or threads 33 within the bearing part 27 is double that of each thread of the two-start thread.

It will be appreciated that in the preferred construction shown the landings or tops of the threads 33 on the bearing length are wider than the threads 24 throughout the working length of the working roller and thus present larger bearing surfaces, and the grooves 34 between these bearing threads are deeper than the grooves 23, so that the preferred working roller has narrow threads throughout its working length and then has wider threads with deeper grooves throughout the bearing length, and these wider bearing threads lie immediately next to a threaded part which lies in an extrusion head or the equivalent. However if desired the increased volumetric capacity in the bearing length may be obtained by widening the threads without deepening the grooves or vice versa.

The construction shown makes it a simple matter to take up any wear of the tapered part of the working roller 15. The bolts 31 pass through lugs 37 on the casing 25 and these lugs are spaced away from the bracket 13 as shown at 39. If wear has to be taken up the left-hand face of the ring 30 (as seen in Figure 1) can be machined or ground to allow the whole extrusion head to move axially to the left, with reduction in the width of the space between the lugs 37 and the bracket 13.

Although in the construction shown, the threads on the working length of the roller are continuous, they may be interrupted or, indeed, this part may have any desired groove formation which will allow the rubber to travel axially when the machine is operated.

The principles involved in the present invention are in no way altered if a third or top roller is provided to cooperate with the working roller in forcing the material axially, as described in Patent No. 2,264,237.

By means of the present invention, I can not only increase the life of the working roller and the bearings generally, but also increase the efficiency, because wear is found in practice to decrease the efficiency of the working roller. In addition it is a comparatively simple matter to vary the clearance between the working roller 15 and the casing 19.

I claim:

1. A machine for working or mixing rubber or other material of a plastic or viscous nature in which the material is worked or mixed in a working space between a helically grooved length of a working roller and a stationary surface and in the course of the working both passes through a nip between the working roller and a cooperating roller and travels axially to be discharged through an extrusion die or other outlet, characterised in that the working roller is supported in a journal bearing at the end remote from the outlet and is unsupported over its grooved working length, and between the grooved working length and the outlet end said working roller is supported directly by a cylindrical bearing which wholly surrounds and engages a cylindrical part of said working roller formed with flat-topped threads, the available cross-sectional area for the passage of material between the threads being larger than that presented by the groove or grooves on the working length.

2. A machine according to claim 1 in which the thread landings on the bearing length of the working roller are wider than those on the working length.

3. A machine according to claim 1 in which the grooves in the bearing length of the working roller are deeper than those in the working length.

4. A machine according to claim 1 in which the thread landings on the bearing length of the working roller are wider than those on the working length and the grooves in the bearing length are deeper than those in the working length.

5. A machine according to claim 1 in which the thread landings on the working length of the working roller are relatively of less diameter than the thread landings on the outlet end bearing thereof with respect to the surrounding surface.

6. A machine according to claim 1 and having an extrusion head with a conical bore, wherein the working roller terminates in a tapered part which fits said conical bore and which has grooves such that the volumetric capacity of said tapered part is roughly constant per unit length.

7. A machine according to claim 1 having an extrusion head with a conical bore and wherein the working roller terminates in a tapered part which fits said conical bore and which has helical grooves of substantially the same volumetric capacity as that of the grooved bearing part of said working roller.

8. A machine according to claim 1 and having an extrusion head, wherein the working roller terminates in a tapered part which enters said extrusion head and this head includes a sleeve partly conical to fit the tapered part of the working roller and partly cylindrical to form the bearing surface for the bearing length of the working roller.

9. A machine according to claim 1 having an extruding head and wherein the working roller terminates in a tapered part which enters said extrusion head and said head includes a partly conical sleeve fitting the tapered part of the working roller, said sleeve being partly cylindrical to form a bearing surface for the bearing of the working roller between the working length and the outlet and axially adjustable to enable wear of the tapered part of the working roller to be taken up.

10. A machine for working rubber and like material comprising, in combination, a working roller circumferentially grooved in part to form a working length thereof, a feed roller forming a nip with said grooved working length, a stationary surface partly surrounding said grooved working length, two bearings for said working roller, one at each end of said grooved working length, an outlet for worked material spaced axially beyond one of said bearings, and means for rotating said working and feed rollers whereby material is passed repeatedly through said nip and between said working length and said surface and is moved axially towards said outlet, said working roller being supported solely by said bearings, the bearing towards said outlet being cylindrical and the part of said working roller in engagement with said cylindrical bearing being formed as a bearing length with flat-topped threads separated by grooves adapted to transmit freely to said outlet all material reaching said bearing length from said working length.

11. A machine for working rubber and like material comprising, in combination, a working roller having a central working part and a journal part at one end of said working part, a feed roller forming a nip with said central part of said working roller, and means including a cylindrical bearing engaging said journal part, whereby said working roller is supported solely outside said central part, the journal part of said working roller rotating within said cylindrical bearing being formed with flat-topped threads separated by grooves adapted to transmit material freely through said bearing.

12. A machine for working rubber and like material comprising, in combination, a working roller having a central threaded working length merging towards one end into a threaded bearing length, the threads of which are flat-topped and separated by grooves of greater volumetric capacity than those in said working length, a feed roller forming a nip with said working length, a cylindrical bearing in engagement with said bearing length, and bearing means in addition to said cylindrical bearing whereby said working roller is fully supported without engagement of any supporting means with said working length.

13. A machine for working rubber and like material comprising, in combination, a working roller having a working length merging into a bearing length, a feed roller forming a close nip with said working length, a casing partly surrounding said working length and mounted with clearance therefrom, and bearing means supporting said bearing length, said bearing means and bearing length constituting a material conducting bearing comprising cooperating elements one of which presents a cylindrical surface and the other flat-topped threads in contact with said surface.

14. A machine for working rubber and like materials comprising, in combination, a working roller threaded throughout its length and formed successively as a working length, a bearing length and a tapered extruding length, a feed roller forming a nip with said working length, a casing partly surrounding said working length with clearance therefrom, and a support surrounding and engaging said bearing length and extruding length, the grooves between the threads on the bearing and extruding length having a substantially uniform volumetric capacity greater than that of the grooves in said working length.

15. A machine for working rubber and like material comprising, in combination, a working roller formed successively as a working length, a cylindrical bearing length and a tapered extruding length, said working length being free of supporting means and said bearing and extruding lengths being engaged by a supporting sleeve of complementary shape, said sleeve being adjustable axially of said roller to compensate for wear.

16. A machine for working rubber and like material comprising, in combination, a working roller formed with a ribbed working length and a threaded bearing length, a feed roller forming a nip with said working length, a casing partly surrounding said working length with clearance from the tops of the ribs thereon, and a cylindrical bearing engaging the tops of the threads on said bearing length, said threads having tops wider than the tops of said ribs and being separated by grooves deeper than those separating said ribs.

FREDERICK EDWARD BROWN.

REFERENCES CITED

The following references are of record in the file of this patent:

UNITED STATES PATENTS

| Number | Name | Date |
|---|---|---|
| 1,815,809 | Steele | July 21, 1931 |
| 1,904,884 | Royle | Apr. 18, 1933 |
| 2,264,237 | Brown | Nov. 25, 1941 |
| 2,343,529 | Brown | Mar. 7, 1944 |